United States Patent [19]
Murphy

[11] Patent Number: 6,009,335
[45] Date of Patent: Dec. 28, 1999

[54] METHOD OF CALIBRATING AND TESTING SPATIAL NULLING ANTENNA

[75] Inventor: John W. Murphy, Cedar Rapids, Iowa

[73] Assignee: Rockwell Science Center, Inc., Thousand Oaks, Calif.

[21] Appl. No.: 08/938,854

[22] Filed: Sep. 26, 1997

[51] Int. Cl.⁶ .............................. H04Q 7/32; H04B 7/10
[52] U.S. Cl. .................. 455/562; 455/562; 455/101; 455/132; 455/272; 342/360; 342/423; 342/357.08; 342/357.12
[58] Field of Search .................................. 455/561, 562, 455/103, 73, 276.1, 226.1, 13.3, 101, 132, 272, 277.1; 342/357.08, 357.12, 359, 386, 373, 372, 174, 360, 423

[56] References Cited

U.S. PATENT DOCUMENTS

| | | |
|---|---|---|
| 5,263,189 | 11/1993 | Kultgen et al. ................. 455/276.1 |
| 5,469,172 | 11/1995 | Schleder et al. ................. 342/174 |
| 5,724,666 | 3/1998 | Dent ........................... 455/562 |
| 5,826,179 | 10/1998 | Lindenmeier et al. ........... 455/277.2 |
| 5,870,681 | 2/1999 | Myer ........................... 455/582 |
| 5,884,192 | 3/1999 | Karlsson et al. ................ 455/562 |
| 5,903,826 | 5/1999 | Nowak ......................... 455/277.1 |
| 5,926,768 | 7/1999 | Lewiner et al. ................. 455/562 |
| 5,930,243 | 7/1999 | Parish et al. ................... 455/562 |

*Primary Examiner*—Wellington Chin
*Assistant Examiner*—Simon Nguyen
*Attorney, Agent, or Firm*—Kyle Eppele; James P. O'Shaughnessy

[57] ABSTRACT

A method and apparatus is provided for calibrating and detecting faults in a receiver having a multi-element antenna. The method includes the steps of selecting an antenna element of the multi-element antenna and transmitting a signal through the selected element. The method further includes the steps of detecting the transmitted signal through at least one antenna element of a remaining set of elements of the multi-element antenna and calculating a phase shift for the at least one antenna element of the remaining set of elements.

14 Claims, 3 Drawing Sheets

METHOD OF CALIBRATING AND TESTING SPATIAL NULLING ANTENNA

FIELD OF THE INVENTION

The field of the invention relates to global positioning systems and more particularly to antenna systems used by global positioning system receivers. However, it has application to any radio receiver which uses a multiple element antenna.

BACKGROUND OF THE INVENTION

Global navigation satellite systems (GNSS), such as the American NAVSTAR GPS and Russian GLONASS, are known. The NAVSTAR GPS developed by the U.S. Defense Department is a satellite-based radio navigation system which transmits information from which extremely accurate navigational calculations can be made in three-dimensional space anywhere on or near the Earth. Three-dimensional velocity can be determined with equal precision. The GPS uses 24 satellites dispersed in six, inclined, 12 hour circular orbits chosen to insure continuous 24 hour coverage worldwide. Each satellite uses extremely accurate cesium and rubidium vapor atomic clocks for generating a time base. Each satellite is provided with clock correction and orbit information by Earth-based monitoring stations.

Each satellite transmits a pair of L-band signals. The pair of signals includes an L1 signal at a frequency of 1575.42 MHZ and an L2 signal at a frequency of 1227.6 MHZ. The L1 and L2 signals are bi-phase modulated by pseudo-random noise (PRN) codes and an information signal (i.e., navigational data) encoded at 50 Hz. The PRN codes facilitate multiple access through the use of a different PRN code by each satellite.

Upon detecting and synchronizing with a PRN coded signal, a receiver decodes the signal to recover the navigational data, including ephemeris data. The ephemeris data is used in conjunction with a set of Kepler equations to precisely determine the location of each satellite. The receiver measures a phase difference (e.g., time of arrival) of signals from at least four satellites. The time differences are then used to solve a matrix of four equations to provide a space and time solution. The result is a precise determination of location of the receiver in three-dimensional space.

The velocity of the receiver may be determined by a precise measurement of the L1 and L2 frequencies. The measured frequencies are used to determine Doppler frequency shifts for each satellite. The measured differences are used to solve another set of equations to determine a velocity of the receiver relative to the Earth based upon the detected phase shift of the received signals.

While the GPS performs relatively well, there are still situations where receivers cannot detect satellite signals. For instance, where a receiver is located in deep valleys or in the presence of interference, a receiver cannot detect a sufficient number of satellite signals to accurately determine position.

To overcome these difficulties, prior art systems have resorted to various signal enhancing techniques. For example, null steering may be used to reduce the effects of interferors. Beam forming may also be used to maximize signals where the position of a satellite is known.

The use of beam forming requires knowledge of the relative phase shift among the channels. Knowledge of the relative channel phase shift and gain may also be of value for null forming because it may permit determination of the direction of arrival of the interfering source. Accordingly, a need exists for a means of adapting the GPS receiver to changes in the antenna and circuit characteristics that affect the phase characteristics of an antenna.

SUMMARY

A method and apparatus is provided for calibrating and detecting faults in a receiver having a multi-element antenna. The method includes the steps of selecting an antenna element of the multi-element antenna and transmitting a signal through the selected element. The method further includes the steps of detecting the transmitted signal through at least one antenna element of a remaining set of elements of the multi-element antenna and calculating a phase shift for the at least one antenna element of the remaining set of elements.

DETAILED DESCRIPTION OF THE INVENTION

Figure 1:
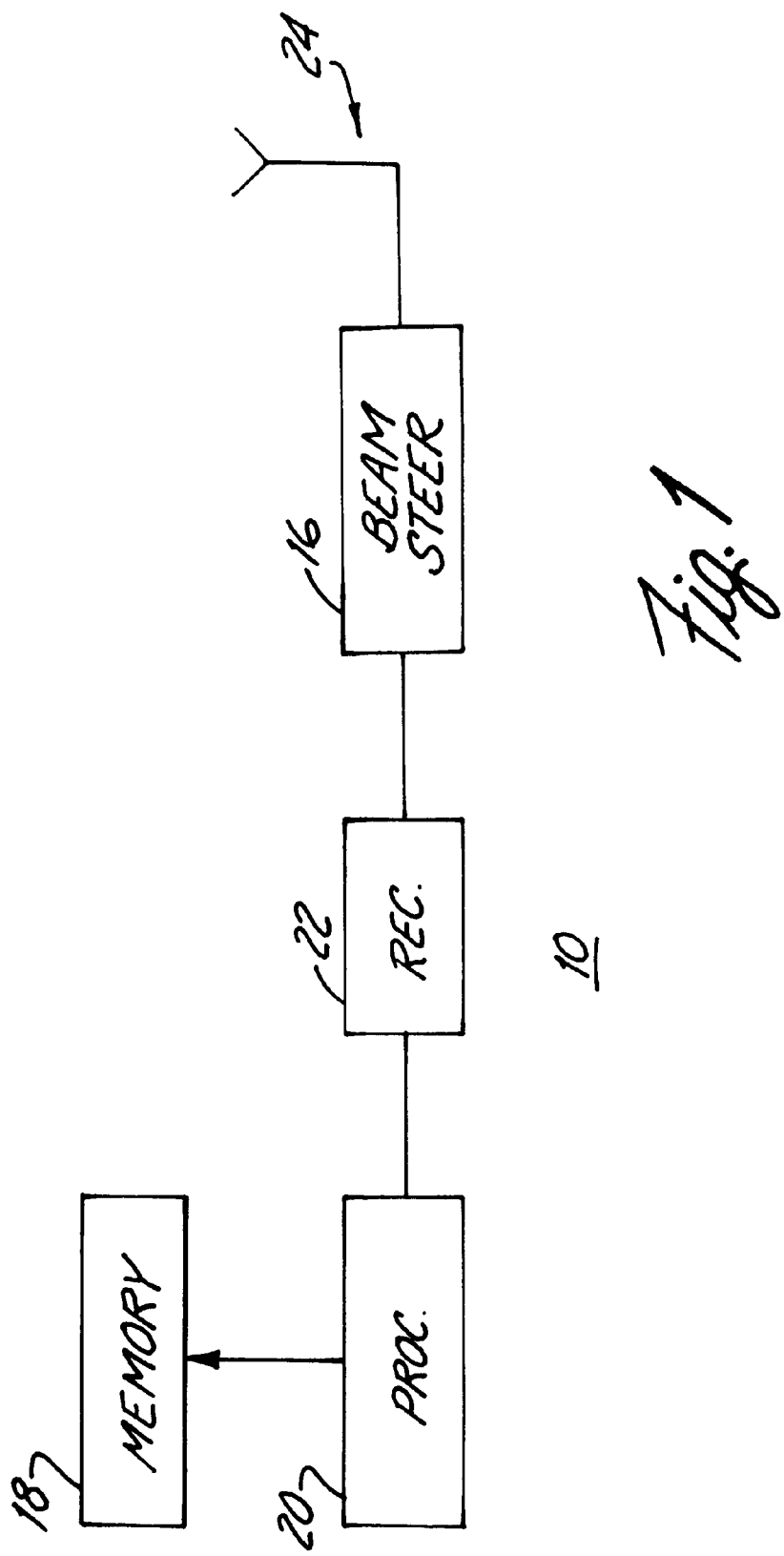
FIG. 1 is a block diagram of a GPS system in accordance with an embodiment of the invention.

FIG. 1 is a block diagram of a global navigation satellite system (GPS system) 10, generally, in accordance with an embodiment of the invention. As used herein, the term "GPS" will be assumed to be synonymous with the broader term "GNSS" and include systems operating under either the NAVSTAR GPS or GLONASS.

In the illustrated embodiment of FIG. 1, a GPS processor 20 determines a location of the system 10 using known GPS processes. After the initial determination of position and velocity, the GPS processor 20 of the system 10 periodically re-determines position and velocity.

Upon start-up, the system 10 begins by searching for a GPS satellite (not shown). Even in areas of poor reception, a system 10 will usually be able to detect at least one satellite. Upon detecting a satellite, the system 10 acquires the signal by synchronizing (cross-correlating) a copy of the PRN code generated in receiver 22 with an encoded signal received on the L1 and L2 channels of the receiver (not shown), as is known in the art.

Upon synchronizing to the signal, the system 10 begins decoding the 50 Hz navigational data superimposed on the PRN encoded signal of the L1 and L2 channels. From the navigational data, the GPS processor 20 recovers the ephemeris data including the Keplerian orbit parameter terms for the satellite. From the Keplerian orbit parameter terms, the processor 20 is able to determine the precise location of the satellite by solving a set of Keplerian orbit equations. In other systems (e.g., GLONASS), the processor may determine location using a set of Earth Centered, Earth Fixed (ECEF) coordinates.

Also from the navigational data, the processor 20 recovers almanac data for other satellites in the area of the satellite first detected. From the almanac data, the processor 20 determines the position of the three additional satellites.

With the position of at least four satellites in its possession, the processor 20 may now attempt to synchronize with signals from those satellites and measure differences in arrival time of each signal from each of the four satellites. The locations and time of arrival of signals from the four satellites allows the processor 20 to form its navigation and time solution. The navigation solution precisely specifies the location of the system 10 in three-dimensional space.

The processor 20 then measures frequency offsets of each of the four acquired signals on the L1, L2 channels to determine a Doppler frequency shift caused by differences in velocity between each of the satellites and the system 10. Upon determining differences for each of the satellites, the processor 20 then solves a set of velocity equations to determine a velocity of the system 10 in three-dimensional space.

Under the embodiment, the beam steering portion 16 of the system 10 forms a complementary adjunct to operation of the GPS processor 20. During normal use of the system 10, the system 10 may often be in areas where the GPS portion cannot easily acquire and decode GPS satellite signals. While the system 10 is in those areas, the beam steering portion 16 provides the additional signal gain necessary to more easily provide a position and velocity solution.

Under an embodiment of the invention, null steering and beam forming may be used to enhance signal acquisition and decoding. Nulls may be steered towards any interfering signal sources. Conversely, a beam may be steered towards a desired satellite, as necessary for purposes of detection and acquisition.

Figure 2:
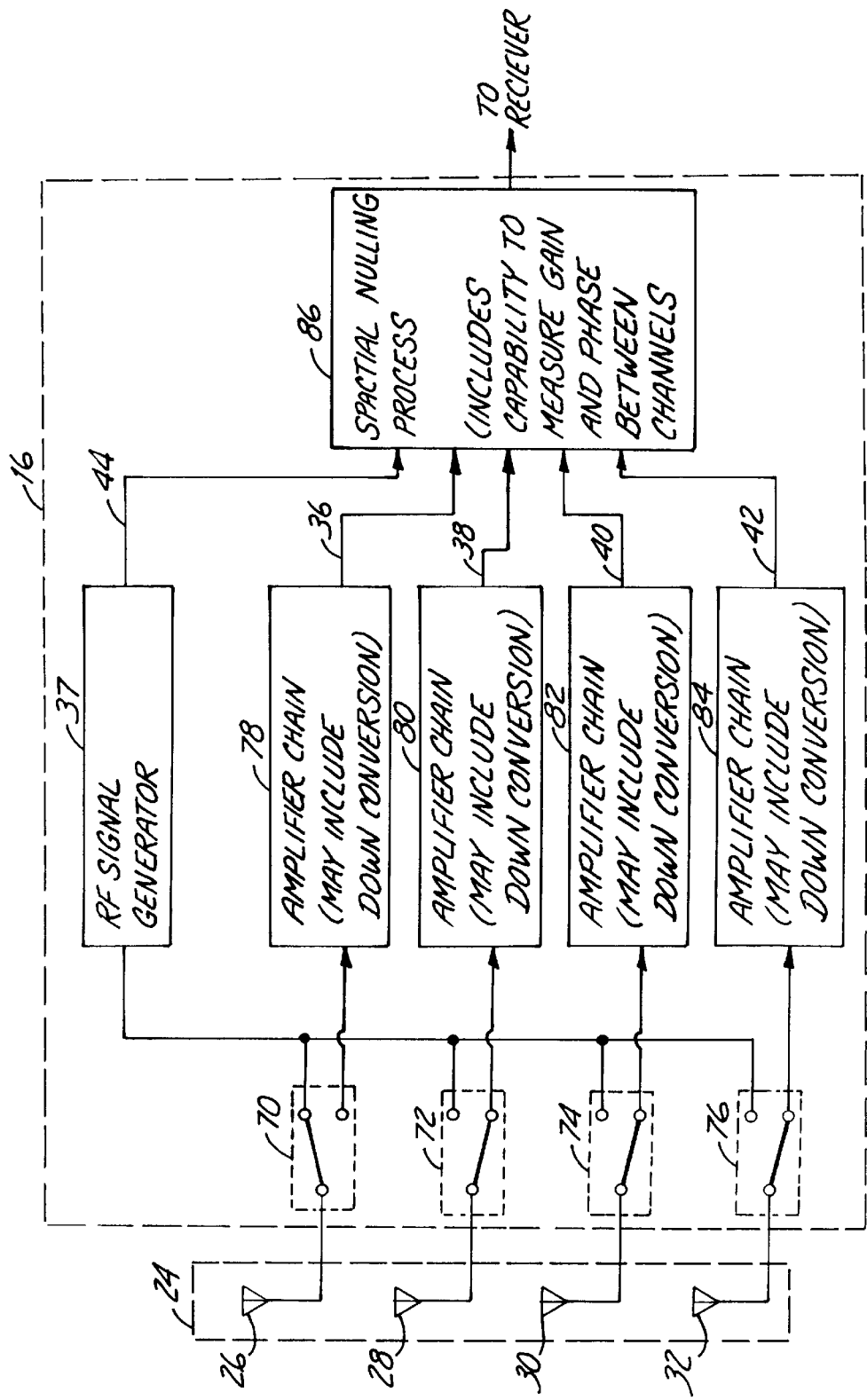
FIG. 2 is a block diagram of an illustrative embodiment of an antenna and beam steering module of the system of FIG. 1.

FIG. 2 depicts an illustrative example of a layout of the antenna 24 and beam steering module 16 under an embodiment of the invention. Under the embodiment, the antenna 24 has a set of array elements 26, 28, 30, 32. One possible configuration of the elements 26, 28, 30, 32 is in the form of a "Y", with one element located at the center, and the remaining three elements equidistant from it and separated by 120 degrees in azimuth. The distance between the center element and the other elements is approximately one-half wave-length at a frequency of 1575 MHZ. Other two or three dimensional antenna arrays could be used under appropriate circumstances.

Assuming that each element 26, 28, 30, 32, is similar, the phase of the signal received by each element is assumed dependent only upon a time of arrival relative to the other elements.

Figure 3:
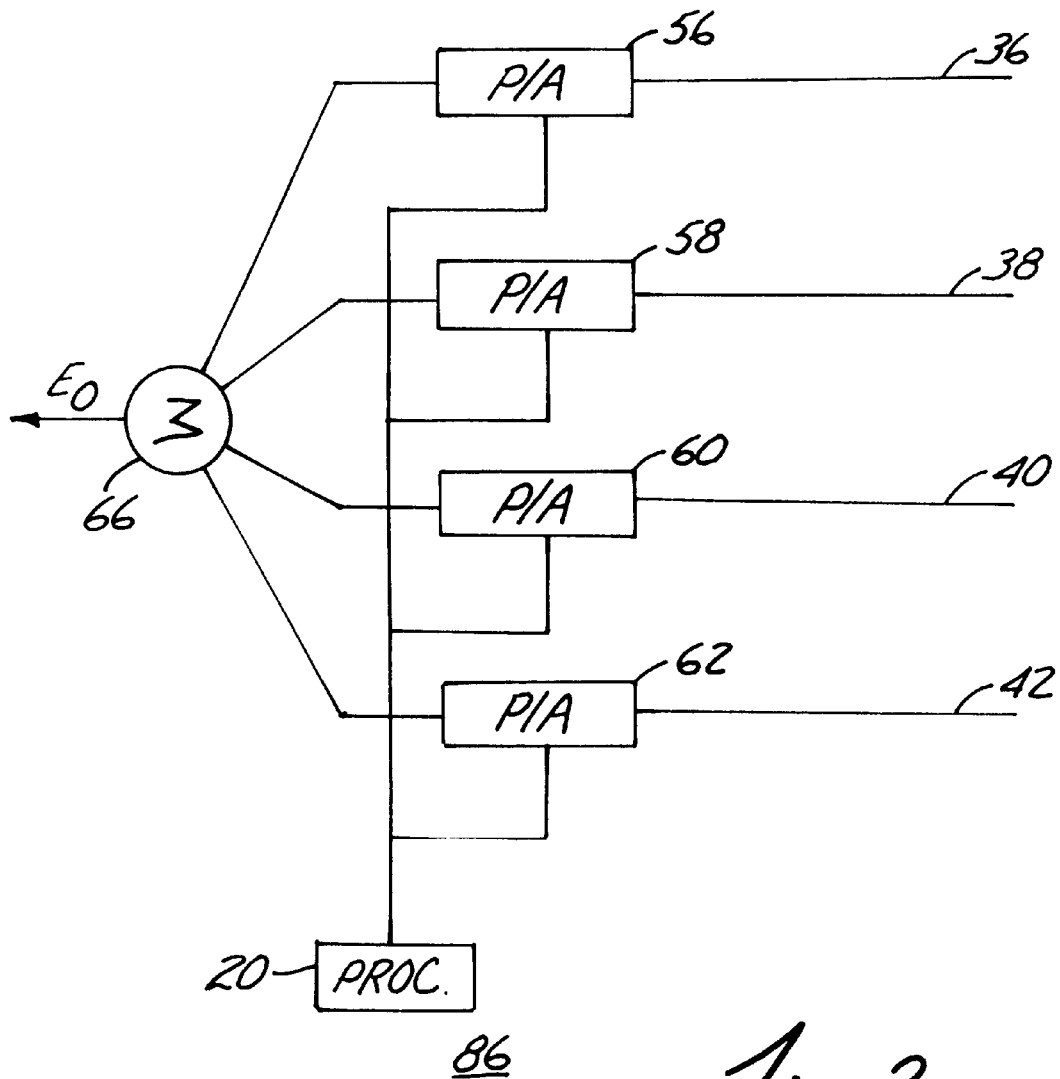
FIG. 3 is a block diagram of an illustrative embodiment of signal processing apparatus located within the beam steering module of FIG. 1.

Within the beam steering module 16 of the Embodiment illustrated in FIG. 3, the output of each element is summed within a summer 66 to produce a composite signal which becomes an input to a decoder (not shown) within the receiver 22. Null steering is accomplished by operation of a set of phase or amplitude adjusters (P/A adjusters) 56, 58, 60, 62 under control of the processor 20. A P/A adjuster, as is known in the art, is a device which receives a digital representation of a signal and which is capable of making amplitude and/or phase adjustments to the digital representation of the signal under the control of a processor 20.

The composite signal provided by the summer 66 to the detector is the sum of the signals received on each antenna element and phase shifted and/or amplitude modulated in the P/A adjusters 56, 58, 60, 62.

Under the embodiment illustrated in FIG. 2, a radio frequency (rf) signal generator 37 is provided as a means of calibrating the beam steering module 16 to the characteristics of the antenna elements 26, 28, 30, 32. Calibrating the steering module 16 allows for better beam and null steering and also provides a means of detecting broken or corrupted circuit elements. A set of rf switches 70, 72, 74, 76 are provided to alternatively switch the rf signal from signal generator 37 to individual antenna elements 26, 28, 30, 32.

Under the embodiment, the rf generator 37 may be first switched onto a first antenna element 26, via switch 70. Amplitude and phase measurements may then be performed on the remaining antenna elements 28, 30, 32. For example, the processor 20 (FIG. 3) may set an amplitude within P/A adjusters 56 and 62 to zero and the amplitude of P/A adjuster 58 to a nominal value. P/A adjuster 60 is now adjusted (e.g., on either side of 180 degrees) so as to minimize the power out of the summing junction 66. At this point the difference in gain of P/A adjuster 58 and 60 indicates the difference in gain of channels 2 and 3; the phase difference of P/A adjuster 58 and 60 along with known phase shift resulting from the array geometry, indicate the relative phase shift between channels 2 and 3. the process may be repeated sequentially for each of the remaining antenna elements 30, 32. The calculated gain and phase may be stored in a gain table in memory 18.

Following measurement of an rf signal amplitude transmitted by a first antenna element 26, the rf switch 70 (shown closed in FIG. 2) may be opened and a second rf switch 72 may be closed. The process may now be repeated to measure a signal amplitude received on the antenna elements 26, 30 and 32 by a signal transmitted from the second antenna element 28.

Measuring the amplitude of the rf signal from each of the non-transmitting antenna elements 26, 28, 30, 32 allows the receiver 22 to detect broken or mismatched connections within the antenna system 24. The amplitude measurements also allows the gain of amplifier modules 78, 80, 82, 84 to be equalized in a manner that cancels any idiosyncrasies present within the antenna system 24.

Specific embodiments of a method and apparatus of calibrating and testing an antenna of a GPS system according to the present invention have been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention any and all modifications, variations, or equivalents that fall within the true spirit and scope of the basic underlying principles disclosed and claimed herein.

I claim:

1. A method of calibrating a receiver having a multi-element antenna comprising the steps of:

selecting a first antenna element from any one element of the multi-element antenna;

transmitting a signal through the selected first element;

detecting the transmitted signal through at least one element of a remaining set of elements of the multi-element antenna;

determining a phase shift for the at least one element of the remaining set of elements;

selecting a second antenna element from any one of the remaining elements of the multi-element antenna;

transmitting a signal through the second selected antenna element to a second set of remaining antenna elements of the multi-element antenna;

detecting the transmitted second signal from the second selected antenna by each antenna element of the second set of remaining elements; and calculating a phase shift for each element of the second set of remaining elements by comparing a phase of the transmitted second signal from the second selected antenna element with a phase of the detected second signal received through each of the second set of remaining elements.

2. The method as in claim 1 further comprising:

measuring the amplitude of the signal detected through the remaining set of elements; and equalizing gains of amplifiers coupled to the antenna elements as a function of the measured amplitude.

3. The method as in claim 1 wherein comparing comprises setting a phase of the detected signal to 180 degrees and summing the detected signal with the transmitted signal.

4. The method as in claim 3 further comprising dithering the phase shift of the detected signal to identify a relative minima in the sum of the phase shifted detected signal and a signal on another channel.

5. Apparatus for calibrating a receiver having a multi-element antenna comprising:

means for selecting a first antenna element from any one element of the multi-element antenna;

means for transmitting a signal through the selected first element;

means for detecting the transmitted signal through at least one element of a remaining set of elements of the multi-element antenna;

means for calculating a phase shift for the at least one antenna element of the remaining set of elements by comparing a phase of the transmitted signal with a phase of the detected signal;

means for selecting a second antenna element from any one of the remaining elements of the multi-element antenna;

means for transmitting a second signal through the second selected antenna element to a second set of remaining antenna elements of the multi-element antenna;

means for detecting the transmitted second signal from the second selected antenna by each antenna element of the second set of remaining elements; and means for calculating a phase shift for each element of the second set of remaining elements by comparing a phase of the transmitted second signal from the second selected antenna element with a phase of the detected second signal received through each of the second set of remaining elements.

6. A method of calibrating a receiver having a multi-element antenna comprising the steps of:

selecting a first antenna element from any one element of the multi-element antenna;

transmitting a signal through the selected first element;

detecting the transmitted signal through at least two elements of a remaining set of elements of the multi-element antenna;

determining a relative phase shift between the elements of the remaining set of elements;

selecting a second antenna element from any one of the remaining elements of the multi-element antenna;

transmitting a signal through the second selected antenna element to a second set of remaining antenna elements of the multi-element antenna;

detecting the transmitted second signal from the second selected antenna by each antenna element of the second set of remaining elements; and calculating a relative phase shift between elements of the second set of remaining elements.

7. The method as in claim 6 further comprising:

measuring the amplitude of the signal detected through the remaining set of elements; and equalizing gains of amplifiers coupled to the antenna elements as a function of the measured amplitude.

8. The method as in claim 6 wherein comparing comprises setting a phase of the detected signal to 180 degrees and summing the detected signal with another signal.

9. The method as in claim 8 further comprising dithering the phase shift of the detected signal to identify a relative minima in the sum of the phase shifted detected signal and a signal on another channel.

10. A method of detecting faults in a receiver having a multi-element antenna comprising the steps of:

selecting a first antenna element from any one element of the multi-element antenna;

transmitting a signal through the selected first element;

detecting the transmitted signal through at least one element of a remaining set of elements of the multi-element antenna;

determining a phase shift for the at least one element of the remaining set of elements by comparing a phase of the transmitted signal with a phase of the detected signal;

selecting a second antenna element from any one of the remaining elements of the multi-element antenna;

transmitting a signal through the second selected antenna element to a second set of remaining antenna elements of the multi-element antenna;

detecting the transmitted second signal from the second selected antenna by each antenna element of the second set of remaining elements;

calculating a phase shift for each element of the second set of remaining elements by comparing a phase of the transmitted second signal from the second selected antenna element with a phase of the detected second signal received through each of the second set of remaining elements.

11. The method as in claim 10 further comprising:

measuring the amplitude of the signal detected through the remaining set of elements; and equalizing gains of amplifiers coupled to the antenna elements as a function of the measured amplitude.

12. The method as in claim 10 wherein comparing comprises setting a phase of the detected signal to 180 degrees and summing the detected signal with another signal.

13. The method as in claim 12 further comprising dithering the phase shift of the detected signal to identify a relative minima in the sum of the phase shifted detected signal and a signal on another channel.

14. Apparatus for calibrating a receiver having a multi-element antenna comprising:

means for selecting a first antenna element from any one element of the multi-element antenna;

means for transmitting a signal through the selected first element;

means for detecting the transmitted signal through at least one element of a remaining set of elements of the multi-element antenna;

means for calculating a relative phase shift between the elements of the remaining set of elements;

means for selecting a second antenna element from any one of the remaining elements of the multi-element antenna;

means for transmitting a second signal through the second selected antenna element to a second set of remaining antenna elements of the multi-element antenna;

means for detecting the transmitted second signal form the second selected antenna by each antenna element of the second set of remaining elements; and means for calculating a phase shift for each element of the second set of remaining elements by comparing a phase of the transmitted second signal from the second selected antenna element with a phase of the detected second signal received through each of the second set of remaining elements.

* * * * *